US009462075B2

(12) United States Patent
Liddicott

(10) Patent No.: US 9,462,075 B2
(45) Date of Patent: Oct. 4, 2016

(54) ENCRYPTED CACHED CONTENT SYSTEM

(71) Applicant: Dell Products L.P., Round Rock, TX (US)

(72) Inventor: Samuel Liddicott, Wakefield (GB)

(73) Assignee: Dell Products L.P., Round Rock, TX (US)

( * ) Notice: Subject to any disclaimer, the term of this patent is extended or adjusted under 35 U.S.C. 154(b) by 197 days.

(21) Appl. No.: 14/041,785

(22) Filed: Sep. 30, 2013

(65) Prior Publication Data
US 2015/0095637 A1 Apr. 2, 2015

(51) Int. Cl.
*H04L 29/00* (2006.01)
*H04L 29/08* (2006.01)
*H04L 29/06* (2006.01)

(52) U.S. Cl.
CPC ........... *H04L 67/2852* (2013.01); *H04L 63/12* (2013.01)

(58) Field of Classification Search
CPC .................................. H04L 9/14; G06F 15/16
USPC .......................................... 380/210; 709/206
See application file for complete search history.

(56) References Cited

U.S. PATENT DOCUMENTS

| 7,920,703 B2 * | 4/2011 | Candelore ..................... 380/210 |
| 2012/0215858 A1 * | 8/2012 | Bhogal et al. ................ 709/206 |

* cited by examiner

*Primary Examiner* — Jeffrey Pwu
*Assistant Examiner* — Michael D Anderson
(74) *Attorney, Agent, or Firm* — Haynes and Boone, LLP

(57) ABSTRACT

An encrypted cached content system includes a user IHS, a content provider IHS, and a caching IHS. The caching IHS includes a caching engine that is configured to receive a content request from the user IHS. The caching engine generates a user-side key using content identifying information in the content request, and forwards the content request to the content provider IHS over a network as a content partial information request. In response to receiving a content partial information response from the content provider IHS over a network, the caching engine generates a content-provider-side key using header information in the content partial information response. The caching engine performs a hashing operation on the content request using a combination of the user-side key and the content-provider-side key to produce a hashed content request, and uses the hashed content request to retrieve content from the cache.

20 Claims, 4 Drawing Sheets

ENCRYPTED CACHED CONTENT SYSTEM

BACKGROUND

The present disclosure relates generally to information handling systems, and more particularly to systems and methods for caching content that is communicated between information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, caching proxy server IHSs ("caching proxies"), are used to accelerate content requests by retrieving content saved from a previous request made by users. Caching proxies keep local copies of frequently requested resources, allowing large organizations to significantly reduce their upstream bandwidth usage and costs, while significantly increasing performance and saving time for users. For example, most large businesses and Internet Service Providers (ISPs) have a caching proxy.

However, problems arise when administrators of caching proxies exercise control over the content that is cached, and in some jurisdictions (and depending on the political climate) the caching of politically sensitive material can be legally risky and yet impossible to control effectively. Furthermore, the liabilities and responsibilities for administrators of caching proxies such as ISPs are uncertain. Across jurisdictions the qualifications for, or existence of, common carrier status may be in doubt, and may vary according to circumstances. While the Digital Millennium Copyright Act (DMCA) relinquishes system operators from copyright liability for purposes of caching, the DMCA does not cover all cases, is subject to change or reinterpretation, and does not apply in non-US jurisdictions.

Accordingly, it would be desirable to provide an improved content caching system.

SUMMARY

According to one embodiment, an encrypted cached content system includes a user information handling system (IHS); a content provider IHS; and a caching IHS connected to each of the user IHS and the content provider IHS through at least one network, the caching IHS including a cache and a caching engine that is configured to: receive a content request from the user IHS over the at least one network; generate a user-side key using content identifying information in the content request; forward the content request to the content provider IHS over the at least one network as a HEAD request and, in response, receive a HEAD response from the content provider IHS over the at least one network; generate a content-provider-side key using header information in the HEAD response; perform a hashing operation on the content request using a combination of the user-side key and the content-provider-side key to produce a hashed content request; and use the hashed content request to retrieve encrypted content from the cache

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
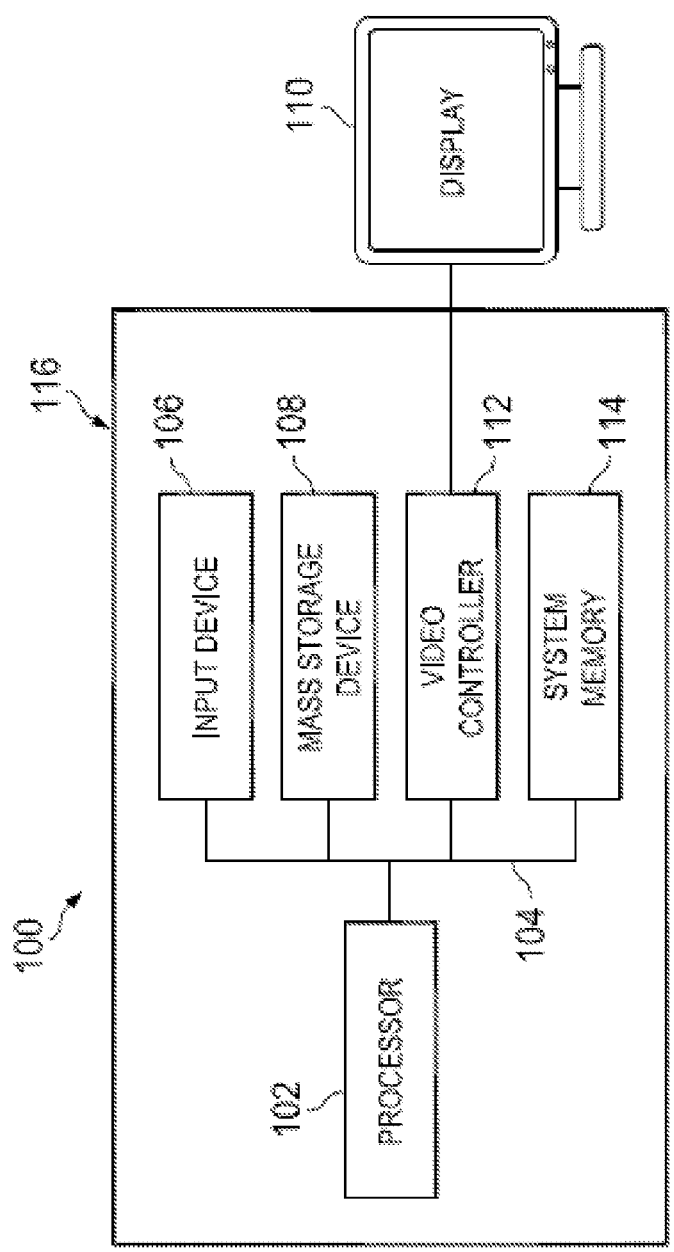
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
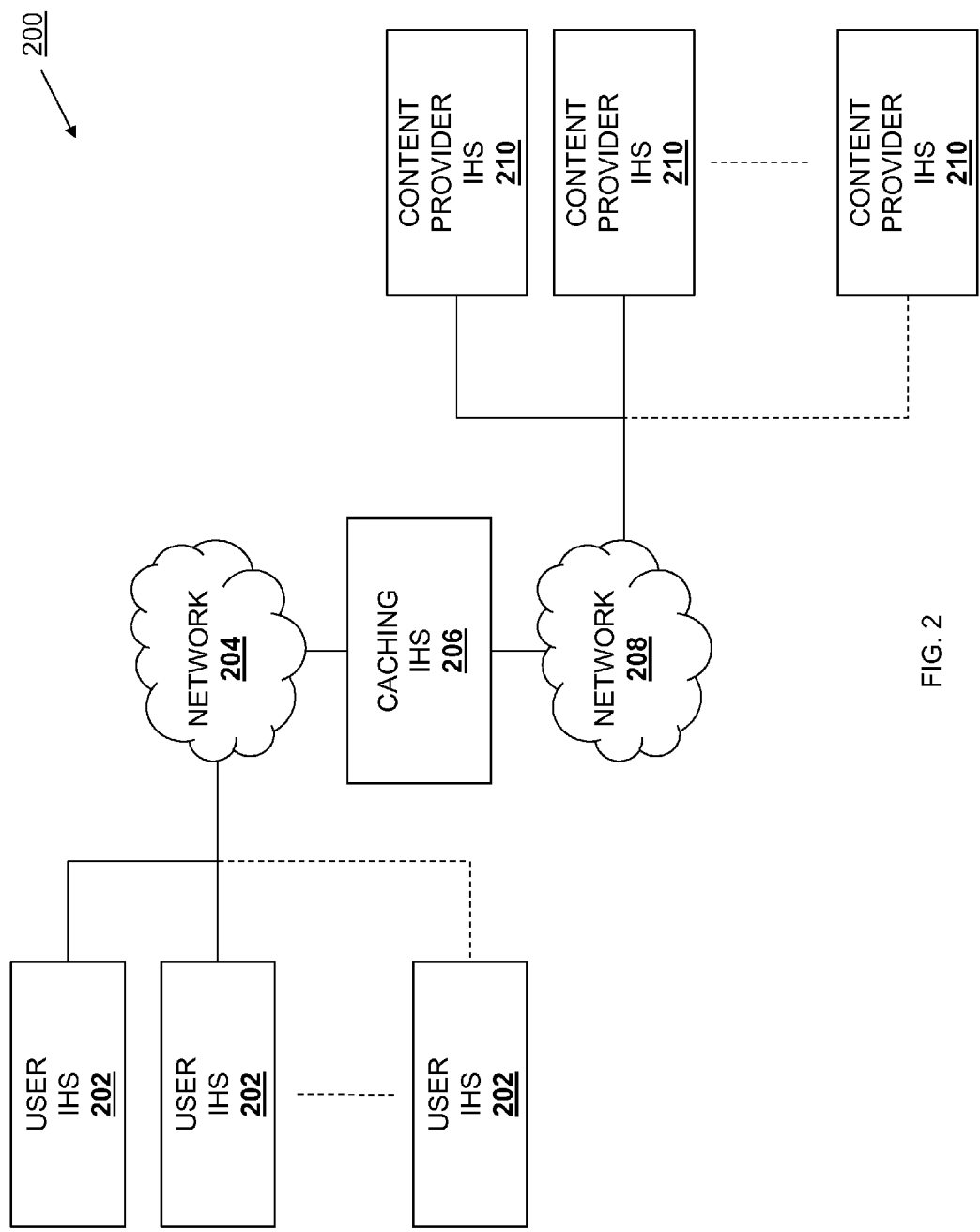
FIG. 2 is a schematic view illustrating an embodiment of an encrypted cached content system.

Referring now to FIG. 2, an embodiment of an encrypted cached content system 200 is illustrated. The encrypted cached content system 200 includes a plurality of user IHSs 202, each of which may be the IHS 100 discussed above with reference to FIG. 1, and/or which may include some or all of the components of the IHS 100. For example, the user IHSs 202 may include desktop IHSs, laptop IHSs, tablet IHSs, mobile phone IHSs, and/or a variety of other user IHSs known in the art. The plurality of user IHSs 202 are coupled to a network 204, which may be a local area network (LAN), a wide area network (WAN), the Internet, and/or a variety of other networks known in the art. The encrypted cached content system 200 also includes a caching IHS 206, which may be the IHS 100 discussed above with reference to FIG. 1, and/or which may include some or all of the components of the IHS 100. For example, the caching IHS 206 may include one or more servers and/or software components that operate to perform the operations of the caching IHS, discussed below. Exemplary caching server IHSs may include, for example, stand-alone and enterprise-class servers operating a server OS such as a MICROSOFT® OS, a UNIX® OS, a LINUX® OS, or other suitable server-based OS. The caching IHS 206 is communicatively coupled to the user IHSs 202 through the network 204. However, in some embodiments, the components of the caching IHS 206 may be included in the user IHS 202, and thus the network 204 may be omitted. The caching IHS 206 is also coupled to a network 206, which may be a local area network (LAN), a wide area network (WAN), the Internet, and/or a variety of other networks known in the art. The encrypted cached content system 200 also includes a plurality of content provider IHSs, each of which may be the IHS 100 discussed above with reference to FIG. 1, and/or which may include some or all of the components of the IHS 100. For example, the content provider IHSs may include one or more servers and/or software components that operate to perform the operations of the content provider IHSs, discussed below. Exemplary content provider server IHSs may include, for example, stand-alone and enterprise-class servers operating a server OS such as a MICROSOFT® OS, a UNIX® OS, a LINUX® OS, or other suitable server-based OS. While the networks 204 and 208 are illustrated as separate and/or different networks, in some embodiments, the caching IHS 206 may be coupled the user IHSs 202 and the content provider IHSs 210 through the same network.

In one example, the user IHSs 202 may be operated by users of an Internet service that is provided by an Internet Service Provider (ISP) that operates the caching IHS 206, and the content provider IHSs 210 may by operated by content providers that provide content (e.g., text files, audio files, video files, application files, executable files, and/or a variety of other content known in the art) to the users through the ISP. In another example, the user IHSs 202 may be operated by employees of a business that operates the caching IHS 206, and the content provider IHSs 210 may by operated by content providers that provide content (e.g., text files, audio files, video files, application files, executable files, and/or a variety of other content known in the art) to the users through server IHSs operated by the business. While a few examples have been provided, one of skill in the art will recognize that a wide variety of caching systems that provide for the caching of content will benefit from the teachings of the present disclosure, and thus will fall within the scope of the present disclosure. As such, the teachings of the present disclosure should not meant to limited to a caching system operated by any particular entity such as an ISP or business.

Figure 3:
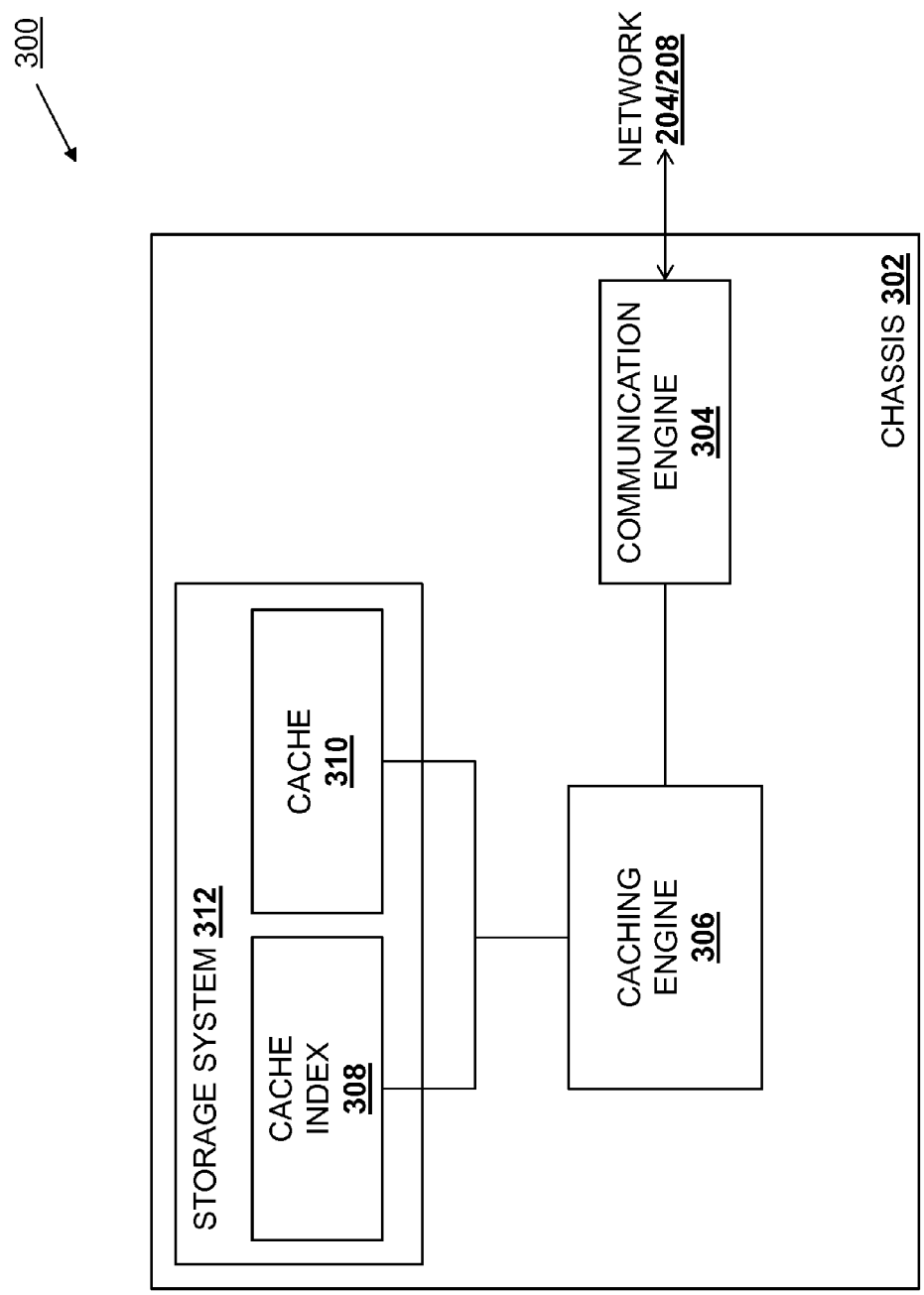
FIG. 3 is a schematic view illustrating an embodiment of a caching IHS.

Referring now to FIG. 3, an embodiment of a caching IHS 300 is illustrated. In an embodiment, the caching IHS 300 may be the IHS 100, discussed above with reference to FIG. 1, or the caching IHS 206, discussed above with reference to FIG. 2. In the illustrated embodiment, the caching IHS 300 includes a chassis 302. While the chassis 302 is illustrated as a single chassis, in some embodiments the caching IHS 300 may be distributed across multiple chassis. The chassis 302 houses a non-transitory memory (e.g., the system memory 114 illustrated in FIG. 1) that includes instructions that, when executed by one or more processors in the chassis 302, cause the one or more processors to provide a communication engine 304 and a caching engine 306. The communication engine 304 is coupled to the network(s) 204 and/or 208 (e.g., through a connection between the one or more processors and a network controller) and is configured to send and receive communications over the network(s) 204 and/or 208. The caching engine 306 is in communication with the communication engine 304 and is configured to perform the functions of the caching IHS 300 discussed below. The caching engine 306 is also coupled to each of a cache index 308 and a cache 310 that are provided in a storage system 312, which may be the storage device 108 discussed above with reference to FIG. 1. While a specific example of a caching IHS 300 has been provided, one of skill in the art in possession of the present disclosure will recognize that a wide variety of IHSs and IHS components may be utilized to provide a caching IHS that will fall within the scope of the present disclosure.

Figure 4:
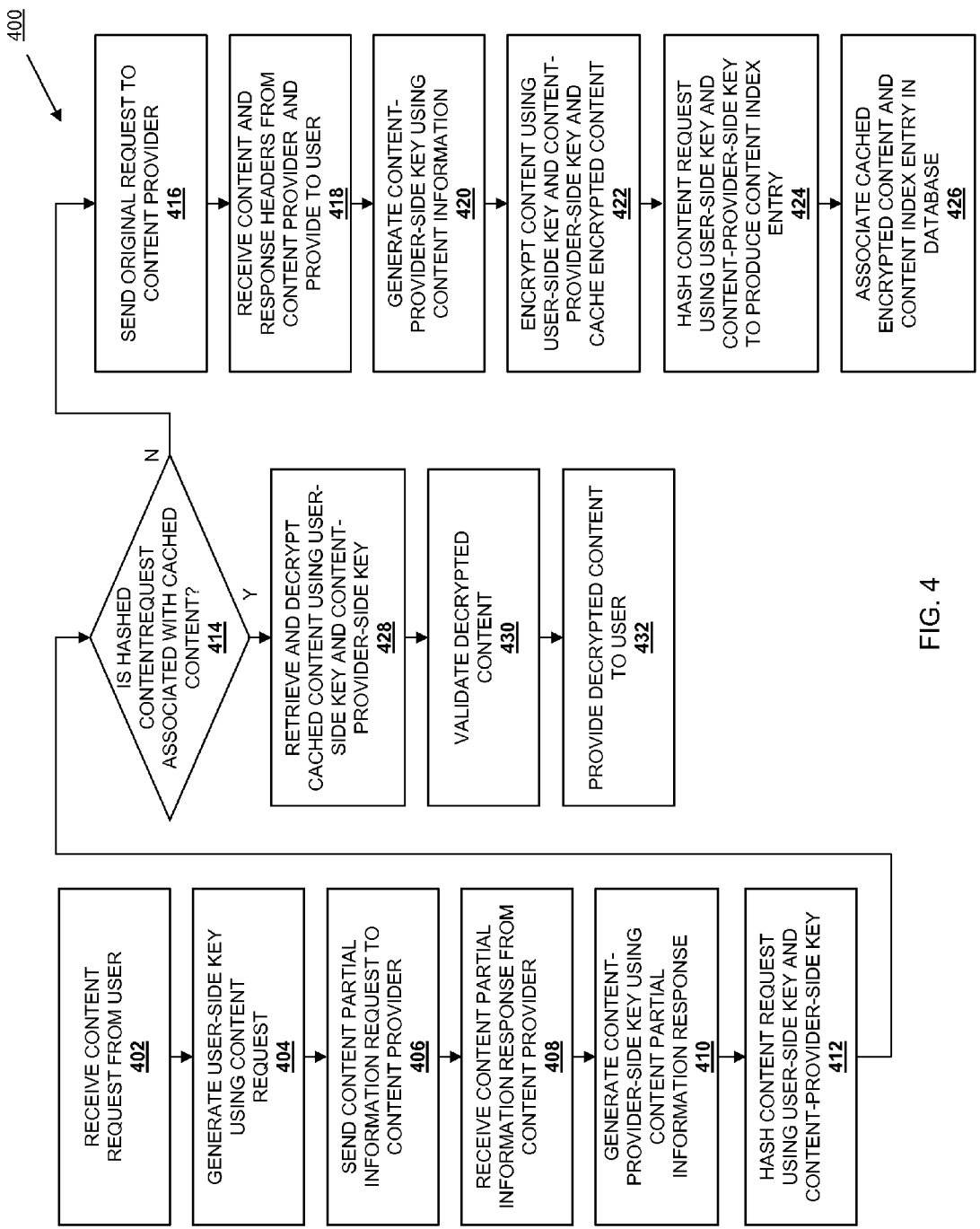
FIG. 4 is a flow chart illustrating an embodiment of a method for caching content.

Referring now to FIG. 4, an embodiment of a method 400 of caching content is illustrated. The method 400 describes techniques for encrypting cached content in a caching system to render that content unexamineable such that the caching system provider may not be held liable or otherwise responsible for content that is cached. As described in more detail below, the method 400 provides for the encryption of all content that is cached using keys that are derived from data provided by the two endpoints in a content request, making the two endpoints party to the encryption and leaving the caching system without the ability to regenerate the key in order to decrypt cached content on demand. The method 400 provides a caching system that is difficult to examine for specific content, and in the event the caching system is examined and specific content is found, the caching system provider will have had no previous knowledge of that specific content (as it was encrypted using keys generated from information that was provided by the endpoints and thus was outside of the caching system providers control), and it may be argued that that specific content did not exist prior to decryption (e.g., if the system is treated as a "black box").

The method 400 begins at block 402 where a content request is received from a user. In an embodiment, at block 402, a user uses an input device on a user IHS 202 to request content (e.g., text files, audio files, video files, image files, application files, executable files, and/or a variety of other content or data that may be transmitted using, for example, HTTP), and a content request is sent over the network 204 to the caching IHS 206/300. While the content request is discussed herein as being received by the caching engine 306 over the network 204, and the content as being provided by the caching engine 306 over the network 204, in some embodiment, the caching engine 306 may be included in the user IHS 202 and thus no network may be used in receiving the content request and providing the content. The caching engine 306 in the caching IHS 300 receives the content request through the communication engine 304. In an embodiment, the content request may include a content identifier such as a Uniform Resource Identifier (URI), an authorized user name of the user, accepted content type, cookies, and/or a variety of other content request information known in the art. The user IHS 202 may be connected to a content provider IHS 210 through the caching IHS 206, as discussed above, and in one example the content request may be sent from the user IHS 202 to the caching system 206 in response to the user selecting a link located on a web page that is provided by the content provider IHS (or other web page provider IHS) to the user IHS 202 through the caching IHS 206. In another example, the content request may be sent from the user IHS 202 to the caching system 206 in response to the user selecting the content for provision in an application on the user IHS 202 that is in communication with the content provider IHS 210 through the caching IHS 206. While a few examples have been provided, the content request may be received by the caching IHS 206 at block 402 in response to a variety of different content request actions known in the art.

The method 400 then proceeds to block 404 where a user-side key is generated using the content request. In an embodiment, at block 404 the caching engine 306 uses content identifying information from the content request to generate a user-side key. Examples of content identifying information may include, but are not limited to, the URI, the authenticated user name, accepted content type, cookie names (but not values), and/or a variety of other content identifying information known in the art that is included in a content request. In many embodiments, the content identifying information from the content request is unique to the content being requested. However, in some embodiments, data from the content request that is used to generate the user-side key may include non-identifying information (e.g., data that does not uniquely identify the content being requested) that is located in fields of the content request that vary in their content. Examples of non-identifying information that may be used in generating a user-side key may include user agent information, the domain of the http-referrer, and/or a variety of other non-identifying information known in the art. The use of non-identifying information to generate the user-side key may result in cache duplication (e.g., multiple copies of the same cached content) in the caching system described herein, but may offer the benefit of increasing the difficulty in determining the content that has been cached. For example, in order to determine if content is cached in the system by decrypting what is in the cache, guesses must be made at the encryption key. The wider the source of values that can contribute to the key (i.e., through the user of both identifying and non-identifying information), the larger the key may be. As long as the actual variation on extra values is small enough on a given network, an unauthorized user may expect that many clients will use the same values, and thus a guess of those values will result in enough cache-hits to make guessing worthwhile. However, without prior knowledge of what the actual range of values on the network is (or was), this knowledge provides less help for guessing the key. The generation of the user-side key using the content identifying information, the non-identifying information, and/or combinations thereof may be accomplished by various combinations of methods including concatenation, compression, encryption, encoding, hashing, and use of a local salt.

The method 400 then proceeds to block 406 where a content partial information request is sent to a content provider. In an embodiment, at block 406, the caching engine 306 forwards the content request received at block 402 through the communication engine 304 and over the network 208 to the content provider IHS 210 to which that content request is directed (e.g., via the URI) as a Hypertext Transfer Protocol (HTTP) HEAD request. For example, the caching engine 306 may use the URI, the authenticated user name, and/or other information from the original content request to generate a HEAD request, and then send that HEAD request to one or more of the content providers IHS 210. As is known in the art, a HEAD request provides a request to return response headers (e.g., in a HEAD response) that includes a variety of information about a requested resource (e.g., the content being requested), but not the actual resource. As is known in the art, HTTP HEAD methods are identical to HTTP GET methods except that the responding device must not return a message body in the response. The meta information contained in the HTTP headers in response to a HEAD request should be identical to the information sent in response to a GET request. This method can be used for obtaining meta information about the entity implied by the request without transferring the entity-body itself. This method is often used for testing hypertext links for validity, accessibility, and recent modification. The response to a HEAD request may be cacheable in the sense that the information contained in the response may be used to update a previously cached entity from that resource. If the new field values indicate that the cached entity differs from the current entity (as would be indicated by a change in Content-Length, Content-MD5, ETag or Last-Modified), then the cache may treat the cache entry as stale.

In some embodiments, at block 406, the caching engine 306 may forward the content request received at block 402 through the communication engine 304 and over the network 208 to the content provider IHS 210 to which that content request is directed (e.g., according to the URI) as a HTTP GET request that has been modified to request only a portion of the content. For example, the caching engine 306 may forward the original content request as a range GET request that includes a byte range request or range retrieval request. In another example, the caching engine 306 may forward the original content request as a GET request that restricts the response transfer such as, for example, by using a restricted Transmission Control Protocol (TCP) window size to suspend the transfer of the request after a portion of the response has been received. As discussed below, this allows a portion of the content (e.g., the response body and/or the response headers) to be used to generate the keys discussed below. Thus, in addition to metadata, portions of the content itself may be used to generate a key, allowing for much larger keys to be used to better obscure the content. In other embodiments, the content partial information request may be a normal HTTP GET request, and as described below, as the content associated with that GET request is being provided, the caching engine 306 may use the currently received portion of the content (which is not the full content requested) to generate keys, produced hashed content requests, and retrieve content as described below prior to the full content being provided.

The method 400 then proceeds to block 408 where a content partial information response is received from the content provider. In an embodiment, at block 408, the content provider IHS 210 that received the HEAD request sends a HTTP HEAD response over the network 208 to the caching IHS 206/300. The caching engine 306 in the caching IHS 300 receives the HEAD response through the communication engine 304. As discussed above, the HEAD response may include a variety of information about the content being requested by the user, but not the content itself. In an embodiment, the HEAD response received at block 408 may include HTTP response headers that include header information that is unique to the content being requested such as, for example, a last-modified time for the content being requested, HTTP entity tag (ETAG) values, content-length information for the content being requested, mime-types for the content being requested, age, retry-after, location, and/or a variety of other HEAD response information known in the art. Furthermore, the HEAD response may include information that is not necessarily unique to the content being requested, as it may be information that can change unpredictably for the same content, and may include compression type information for the content being requested, server, via, and/or a variety of other non-content-unique HEAD response information known in the art. In embodiments where a GET request is used to request only a portion of the content, or a portion of content is received according to a normal GET request, the portion of that content requested or received may be received at block 408 and used for the same purposes in conjunction with, or in place of, the response headers.

The method 400 then proceeds to block 410 where a content-provider-side key is generated using the content partial information. In an embodiment, the content-provider-side key is generated using the HEAD response and/or, in some embodiments, the portion of the content requested at block 406 and received at block 408. In an embodiment, at block 410, the caching engine 306 uses header information from the HEAD response received at block 408 to generate a content-provider-side key. Examples of header information from the HEAD request that is used to generate the content-provider-side key may include, but is not limited to, a last-modified time for the content being requested, HTTP entity tag (ETAG) values, content-length information for the content being requested, mime-types for the content being requested, age, retry-after, location, and/or a variety of other HEAD response information known in the art. In many embodiments, the header information from the HEAD response that is used to generate the content-provider-side key is unique to the content being requested. However, in some embodiments, data from the HEAD response that is used to generate the content-provider-side-side key may include header information may change unpredictably for the same content, such as the compression type information for the content being requested, discussed above. Information like compression type information may differ between different IHSs operated by the same content provider, and may result in multiple copies of the cached content in the encrypted cached content system, but may still be used as a content-provider-side key due to the potentially increased key size. The generation of the content-provider-side key using the header information in the HEAD response, the unpredictably changing information in the HEAD response, the portion of the content, and/or combinations thereof may be accomplished by concatenation, compression, encryption, encoding, hashing, and use of a local salt.

The method 400 then proceeds to block 412 where the content request is hashed using the user-side key and the content-provider-side key. In an embodiment, at block 412 the caching engine 306 uses a combination of the user-side key generated at block 404 and the content-provider-side key generated at block 410 to hash the content request received at block 402 to produce a hashed content request. In an embodiment, the hashing at block 412 is performed using a hash function or other algorithm that maps data of variable length (e.g., the content request) to data of a fixed length (e.g., the hashed content request). In an embodiment, algorithm (i.e., hash function) that map data of variable length to data of a fixed length in the system of the present disclosure may be required to be a one-way function such that the content request cannot easily be derived from the hashing function. In one example, the hash function used at block 412 is a cryptographic hash function. In some embodiments, the hashing at block 412 includes applying a hash function and a combination of the user-side key and the content-provider-side key to the content request, and then encrypting the result using the user-side key and the content-provider-side key to provide the hashed content request. However, other types of functions and/or algorithms known in the art may be used, along with combinations of the user-side key and content-provider-side key, to modify the content request such that the modified content request may be used similarly as the hashed content request discussed below in the encrypted cached content system.

The combination of the user-side key and content-provider-side key used to hash the content request may be performed in a variety of manners while remaining within the scope of the present disclosure. For example, the user-side key and content-provider-side key may be combined and then used to hash the content request to provide the hashed content request. In another example, the user-side key may be used to hash the content request to provide a first partial hashed content request, the content-provider-side key may be used to hash the content request to provide a second partial hashed content request, and the first partial hashed content request and the second partial hashed content request may be combined to provide the hashed content request. While a few examples have been provided, one of skill in the art in possession of the present disclosure will recognize that a wide variety of operations known in the art may be performed on a wide variety of combinations of the user-side key and content-provider-side key to produce the hashed content request used in the encrypted cached content system.

The method 400 then proceeds to decision block 414 where it is determined whether the hashed content request is associated with cached content. As discussed in further detail below, if the hashed content request is not associated with content that has been previously cached, the encrypted cached content system operates to retrieve the content from the content provider, provide that content to the user, encrypt and cache that content, and associated that encrypted cached content with the hashed content request, described in detail below with reference to blocks 416-426. However, as also discussed in further detail below, if the hashed content request is associated with content that has been previously cached, the encrypted cached content system operates to retrieve and decrypt the cached content, validate the decrypted content, and provide the decrypted content to the user, described in detail below with reference to blocks 428-432. In the examples provided below, the caching of content in the encrypted cached content system in blocks 416-426 is described first, followed by the retrieval of that cached content at blocks 428-432. However, one of skill in the art in possession of the present disclosure will recognize that any content associated with a content request from any user IHS 202 may be cached, and any cached content associated with a content request from any user IHS 202 may be retrieved from the cache.

In an embodiment, at decision block 414, the caching engine 306 determines whether the hashed content request is associated with cached content by determining whether the hashed content request corresponds to an entry in the cache index 308 in the storage system 308, discussed in further detail with reference to blocks 424 and 426. If, at decision block 414, the caching engine 306 determines that there is no entry in the cache index 308 that corresponds to the hashed content request, the method 400 proceeds to block 416 where the original request is sent to the content provider. In an embodiment, at block 416, the caching engine 306 forwards the content request received at block 402 through the communication engine 304 over the network 208 to the content provider IHS 210 to which that content request is directed (e.g., via the URI) as the original request. For example, if the original content request received at block 402 was a GET request, that GET request is sent to the content provider. Similarly, if the original content request received at block 402 was a POST request, that POST request is sent to the content provider, if the original content request received at block 402 was a PUT request, that PUT request is sent to the content provider, and so on. In an embodiment, the caching engine 306 may use the URI, the authenticated user name, and/or other information from the original content request to generate a GET request, and then send that GET request to one or more of the content providers IHS 210. While a GET request, which is the most request likely to be cached, is described herein as being sent at block 416, any type of original content request received at block 402 may be forwarded to the content provider at block 416 (e.g., with any optimizations performed by the caching engine). As is known in the art, a GET request provides a request to return the content specified in a content request. In embodiments where a GET request was sent at block 406 to retrieve a portion of the content by using a restricted TCP window size to suspend the transfer of the request after a portion of the response has been received, discussed above, at block 416 the transfer of the response may be resumed (e.g., by increasing the TCP window size) rather than initiating a new GET request.

The method 400 the proceeds to block 418 where content and response headers are received from the content provider, and that content is provided to the user. In an embodiment, the content provider IHS 210 that received the content request sent at block 416 (e.g., the GET request sent at block 416 or resumed at block 416 following suspension at block 406) sends the content and response headers over the network 208 to the caching IHS 206/300. The caching engine 306 in the caching IHS 300 receives the content and the response headers through the communication engine 304. In an embodiment, the response headers received at block 416 may include the header information that is unique to the content, discussed above with regard to the HEAD response received at block 408, as well as information that is not necessarily unique to the content, also discussed above with regard to the HEAD response received at block 408. After receiving the content, the caching IHS 206 may provide that content and the response headers over the network 204 to the user IHS 202 that requested that content at block 402.

The method 400 then proceeds to block 420 where a content-provider-side key is generated using content information such as, for example, the response headers and/or a portion of the content. In an embodiment, at block 420, the caching engine 306 uses header information from the response headers received at block 418 to generate a content-provider-side key. Examples of header information from the response headers that is used to generate the content-provider-side key may include, but is not limited to, a last-modified time for the content that was received at block 418, HTTP entity tag (ETAG) values, content-length information for the content that was received at block 418, mime-types for the content that was received at block 418, and/or a variety of other response header information known in the art. In many embodiments, the header information from the response headers that is used to generate the content-provider-side key is unique to the content that was received at block 418. However, as discussed above, data from the response headers that is used to generate the content-provider-side-side key may include header information may change unpredictably for the same content, such as the compression type information for the content that was received at block 418. The generation of the content-provider-side key using the header information in the response headers that was received at block 418, the unpredictably changing information in the response headers that was received at block 418, the portion of the content, and/or combinations thereof may be accomplished by concatenation, compression, encryption, encoding, hashing, and use of a local salt. In an embodiment, the generation of the content-provider-side key at block 420 is the same as at block 410 and should produce the same content-provider-side key. However, unless a persistent connection is used it may actually be that a different server filled the content request and so the varying header information may differ.

The method 400 then proceeds to block 422 where the content is encrypted using the user-side key and the content-provider-side key, and that encrypted content is cached. In an embodiment, at block 412 the caching engine 306 uses a combination of the user-side key generated at block 404 and the content-provider-side key generated at block 420 to encrypt the content received at block 418 to produce encrypted content. In an embodiment, the encryption at block 422 is performed using an encryption algorithm that that encodes the content (e.g., subsequent to compression of the content) to produce a cipher text such that requires the combination of the user-side key and the content-provide-side to be read. In some embodiments, the encryption at block 422 includes applying an encryption algorithm and a combination of the user-side key and the content-provider-side key to the content to produce the encrypted content. The combination of the user-side key and content-provider-side key used to encrypt the content may be performed in a variety of manners while remaining within the scope of the present disclosure. For example, the user-side key and content-provider-side key may be combined and then used to encrypt the content request to provide the encrypted. In another example, the user-side key may be used to encrypt the content to provide a first partial encrypted content, the content-provider-side key may be used to encrypt the content to provide a second partial encrypted content, and the first partial encrypted content and the second partial encrypted content may be combined to provide the encrypted content. In another example, a longer, more secure random key may be used to encrypt the content, and that random key may then be encrypted using the user-side key and the content-provider-side key and then stored in the cache along with the encrypted content. While a few examples have been provided, one of skill in the art in possession of the present disclosure will recognize that a wide variety of operations known in the art may be performed on a wide variety of combinations of the user-side key and content-provider-side key to produce the encrypted content used in the encrypted cached content system. In an embodiment, at block 422, the caching engine 306 caches the encrypted content by storing that encrypted content in the cache 310 of the storage system 312.

The method 400 then proceeds to block 424 where the content request is hashed using the user-side key and the content-provider-side key to produce a content index entry. In an embodiment, at block 424 the caching engine 306 uses a combination of the user-side key generated at block 404 and the content-provider-side key generated at block 420 to hash the content request received at block 402 to produce an entry for the content index 308 in the storage system. In an embodiment, the hashing at block 424 is performed in substantially the same manner as discussed above for the hashing performed at block 412, and the result of that hashing operation is an entry for the content index 308. In an embodiment, for the same content ("the first content"), the results of the hashing operations performed at block 412 and block 424 are the same (e.g., as long as the varying headers between the HEAD request at block 406 and the GET request at block 416 did not vary). As such, the entry for the content index generated at block 424 may be referenced by performing the same hashing operation at block 412 on a user-side key, generated from a content request for the first content, and a content-provider-side key, generated from information in a HEAD response to that content request, to provide a hashed content request that may be used to look up that entry in the content index.

The method 400 then proceeds to block 426 where the encrypted cached content is associated with the entry in the context index in a database. In an embodiment, at block 426, the caching engine 306 associates the entry for the content index that was produced at block 424 with the encrypted content that was cached at block 422 in a database. The database may be part of the content index 308 and/or be provided elsewhere in the storage system 312. Thus, blocks 402, 404, 406, 408, 410, 412, 414, 416, 418, 420, 422, 424, and 426 of the method 400 describe how the encrypted cached content system may receive a content request from a user for content that has not been previously cached, retrieve that content from a content provider, provide that content to a user, and then encrypt and cache that content. As discussed below with reference to blocks 428, 430, and 432 of the method 400, that encrypted cached content may then be retrieved and provided to users that request it.

In an embodiment, block 402, 404, 406, 408, 410, 412, and 414 of the method 400 may be performed as discussed above and if, at decision block 414, the caching engine 306 determines that there is an entry in the cache index 308 that corresponds to the hashed content request, the method 400 proceeds to block 428 where cached content is retrieved and decrypted using the user-side key and the content-provider-side key. In an embodiment, the caching engine 306 uses the entry in the content index 308 that corresponds to the hashed content request to retrieve the encrypted cached content that is associated with that entry (e.g., as described with reference to block 426) from the cache 310. The caching engine 306 then uses a combination of the user-side key generated at block 404 and the content-provider-side key generated at 410 to decrypt that encrypted cached content. In an embodiment, the decryption of the encrypted cached content uses the same combination of the user-side key and the content-provider-side key that was used to encrypt that content (e.g., as described with reference to block 422). In an embodiment, if the decryption fails, then the method 400 proceeds to block 416 where valid content is requested from the content provider IHS, as discussed below.

The method 400 then proceeds to block 430 where the decrypted content is validated. In an embodiment, at block 430 the caching engine 306 operates to validate the decrypted content by comparing header information in the decrypted content with header information received from the content provider IHS (e.g., in the HEAD response received at block 408) to determine whether the decrypted content is valid (e.g., is the actual content that was requested by the user, as opposed to invalid content that is expired, superseded, or otherwise content that the content provider IHS would not provide if the content request was currently being made to the content provider), is different from the content stored by the content provider IHS, and/or a variety of other validity concerns known in the art. If the decrypted content is validated at block 430, the method 400 may proceed to block 432 where the caching engine 306 provides that content over the network 204 (e.g., through the communication engine 304) to the user IHS 202 that requested it at block 402. In an embodiment where a GET request was suspended at block 406, the underlying transport or connection may be closed by, for example, providing a TCP close or TCP reset.

If the decrypted content is determined to be invalid at block 430, the method 400 may still proceed to block 432 where the caching engine 306 provides that content over the network 204 to the user IHS 202 (e.g., when the decrypted content includes only minor differences from the content stored by the content provider IHS). However, in some situations, a determination that the decrypted content is invalid may result in the caching engine 306 proceeding to block 416 to request valid content from the content provider IHS and, in some cases, then providing that valid content to the user IHS 202 (e.g., as described in detail herein). In embodiments where a GET request was suspended at block 406, that GET request may be resumed at block 430 by, for example, increasing the TCP window size such that the full response may be received as a result of the already-serviced request. Such valid content received by the caching engine may then be encrypted and cached similarly as discussed above with reference to blocks 418, 420, 422, 424, and 426. In some situations, a determination that the decrypted content is invalid may result in the caching engine 306 requesting that the content provider IHS 210 validate that content (e.g., as per blocks 416 and 418) prior to providing that content to the user. In embodiments where a GET request was suspended at block 406, that suspended GET request may not be used to revalidate the content, as that GET request was made before the metadata that is supplied to the content provider IHS could be recovered from the cache. In such embodiments, a revalidating HEAD request may be made based on which the GET request may be resumed, but because the content may have changed since the GET request was suspended, proper revalidation may require that the suspended GET request be aborted (e.g., by closing the transport) and a new GET request issued. Thus, the blocks 402, 404, 406, 408, 410, 412, 428, 430, and 432 of the method 400 describe how the encrypted cached content system may receive a content request from a user for content that has been previously cached, retrieve that content from the cache, decrypt that content, and provide that content to a user.

In some embodiments, in addition to, or instead of, the HEAD response and portion of the content (if a GET request was used), other network services or measurements that produce a consistent response to a query that is composed from data in the original content request may contribute to the content-provider-side key. For example, a resolved IP address of the content-provider-IHS may also be used for this purpose. In another example, the addresses of routers that transport the packets might be used (which can be discovered by altering the time-to-live on the transport packets and monitoring the ICMP responses). In other embodiments, WHOIS information on the domain name, RIPE information on the IP address, netapp uptime reports, canonical domain name servers, last-visited times of the URL as reported a search engine cache, might also be used to generate the content-provider-side key, as these types of information are generally consistent over a short period of time and have distinct elements which vary according to the original request. In addition, some of these measurements (e.g., intermediate router IP addresses) have the advantage of varying according to the location of the cache on the network, making remote predictions of those values more difficult.

The encrypted cached content system may also include systems and engines to provide for the expiration of encrypted cached content stored in the encrypted cached content system. In some embodiments, data about access of encrypted cached content in the encrypted cached content system (e.g., most frequently accessed content, most recently accessed content, etc.), may be stored outside of the encrypted cached content system in order to allow the processing of that data to provide the ability to expire low-value items from the cache. In an embodiment, multiple pieces of data about access of encrypted cached content in the encrypted cached content system is combined into a single value to provide the ability to expire low-value items from the cache without revealing details about that data. For example, combined access and value statistics (i.e., a combination of size and access frequency that can indicate the amount of network traffic that is saved over a period of time) may instead be kept (e.g., in plain-text in association with an encrypted content identifier so that items may be enumerated in the cache and value statistics may be accessed without knowing what URL they are associated with) and used to determine when encrypted cached content may be removed from the cache 310 to make room for more valuable content (e.g., based on the cost of retaining the content relative to the cost of retransmitting that content, based on the rate of access of that content, etc.) In one embodiment, the access and/or value statistics may be provided via exponential rolling averages that are used to product a combination of value that prevents the distinguishing between data that is accessed often, data that has been access recently, etc., as that combination of value may simply include the value and the last time the value was updated. For example, the value may be increased by the size of the content each time that content is updated, but decreased by a fixed percentage every time a predetermined time period passes.

Benefits of using exponential rolling averages may result from the use of only two data items, the value and the time at which that value was valid, because as the value is recomputed at any time, it gives no clue as to when the associated data was retrieved or accessed. For example, a value of 4 at time 10 is exactly equal to a value of 16 at time 8 if the exponential ratio is 50%: at time 9 the value of 16 would be halved to 8, and at time 10 that value of 16 would be halved again to 4. In addition, the value can be recomputed at any moment with fake time values inserted.

As discussed above, the encrypted cached content system prevents access to cached content without a key that is obtained from communications with the content provider IHS, and as such, the option of extracting metadata from cached content (e.g., an ETAG) for use in determining whether the cached content is valid or is not available. The use of the HEAD request in the encrypted cached content system to obtain metadata to construct the key necessary to determine validity of the cached content can increase latency when the cached content is not valid, as an extra HEAD request must be made. For example, normally upon receiving a request, the caching engine will retrieve the cached content and header information including cache expiry time, ETag, etc. If the cache needs validating, it will forward a single request to the server which might return a "not modified" response indicating that the cache may be used. Because the system cannot provide the ETag until after the HEAD request, an additional HEAD request must be made, which can increase the time it takes for the cache to retrieve content in some instances as the server will have to process two requests for the client even in the case where the cached copy was valid. The time it takes for the cache to retrieve content may also be increased in embodiments where a second GET request is required to validate the content, discussed above. The impact of such delays can be reduced using persistent connections or other quick start mechanisms on the forwarded HTTP connection, or by replacing the second HEAD request with the original request and exercising control on the transport (e.g., by restricting the TCP window size) and restoring the transport or closing the transport when it is known if the content needs retransmitting.

In some embodiments, it may be preferred to encrypt some non-identifying response metadata for use in a request (e.g., like an ETAG) with a key derived from, for example, the URI associated with the requested content. Normally, this would make it possible to query the system to discover if the URI was cached, but the system might return some form of ETAG for each case, so such a query could only be used to determine if an item were already in the cache if the correct ETAG were already known. In an embodiment, the ETAG may be stored in a large hash with a fixed number of buckets and fixed size records that are prepopulated with random data, and some ETAG value could be fetched for any URI, but validity could only be determined in comparing it with a known response. For example, processing may be speeded up by reducing the number of requests if the ETAG is known before the request is sent to the server, and that ETAG may be included in the first HEAD request (which allows the system to avoid a second HEAD request if the cached content is valid.) However, ETAG information should not be provided to anyone enumerating the cached contents. Thus, for every URI, the system may return an ETAG whether or not that URI has been visited. That ETAG may include a fixed number of slots, and the URL hash may identify a slot that may contain an ETAG or random data, such that there is no way to know what the actual information is. Furthermore, in some situations ETAGs from content providers may not uniquely refer to content, but may also be associated with a cookie value.

In some embodiments, the colliding hashes prepopulated with random data (e.g., for recalling ETAGs) might also be used indirectly for storing main content. This would prevent examination that enumerates each piece of cached content and attempts to decrypt it, as it would not be clear which is cached content and which is random data, or even how many items of cached content exist. Random overwrites and loss of some cached items would occur, and be recovered as normal when decryption would fail.

Thus, systems and methods for caching content have been described that encrypt content using keys derived from data provided by the two endpoints of a content request, making those two endpoints party to the encryption and leaving the caching system operator without any way to regenerate the keys in order to decrypt a cached content item on demand. As discussed above, the encrypted cached content system of the present disclosure makes it difficult to trawl or browse the cache to look for infringing content, and any content found by searching the cache can be argued to be outside the knowledge of the caching system operator (as it was encrypted by keys outside of the caching system operators control), may be argued to have been obscured by the endpoint parties and not the caching system operator, and may be argued to have not actually existed within the cache appliance until the content request was made and responded to by the content provider. If compression techniques (e.g., dictionary compression) are used in the encrypted cached content system, it may also be argued that the content was never sent into a jurisdiction from a remote server, but rather was constructed inside the cache from data already present.

It may further be argued that the cache is a data-dictionary compression system and that the cached content was recreated from a dictionary at some point of request. In one example, the request and response headers (or parts of them), and/or portions of the content if a range request or transport-suspended GET request are used, might be used to populate the initial dictionary for a sliding window compression system (e.g., a Lempel-Ziv-Welch (LZW) algorithm), with the initial dictionary not being a part of the compressed output. This could support the argument that the content in the cache is not even an encrypted copy, because some of the data is missing to de-compress or re-construct it. In other words, it may be known where repeated items might appear in the output, but not what they are. The initial dictionary may be re-generated at the same time they keys are generated, and can be used to re-construct the content from the de-crypted cache. The initial dictionary might be populated by a document-specific dictionary that is pre-compressed with a dictionary based on the request and response headers and a modified version of the LZW algorithm. In the case where it might be feared that an initial dictionary based solely on the headers would provide little relevance to the content, the content might remain largely intact. So a specific dictionary may be computed from the content, and this dictionary compressed against a dictionary computed from the request and response headers, and/or portions of the content if a range request or transport-suspended GET request are used. The dictionary computed from the content could be computed in such a way that it would compress well against the dictionary based on the response headers. This provides a means to poke as many "holes" in the compressed content as possible even though the missing initial dictionary may be comparatively small.

In another example, in conjunction with an upstream caching proxy of the same type, the upstream cache might provide with the response a larger dictionary (e.g., sliding, fixed, and/or other types of dictionaries known in the art) against which the cache content might be compressed and de-compressed. Thus the cache could never re-construct the document even if it were decrypted unless the upstream dictionary was also provided. The upstream cache could then be located in a different jurisdiction. In such a situation, the content then cannot be said to reside anywhere in the cache, as it is re-reconstructed on demand (e.g., rather than simply decrypted on demand).

The caching IHS in the encrypted cached content system may also be encrypted itself, e.g., with a random key derived on startup of the caching system, in order to make offline analysis more difficult, and may include systems for flushing the cache upon a loss of power to the caching IHS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An encrypted cached content system, comprising:
   a user information handling system (IHS);
   a content provider IHS; and
   a caching IHS connected to each of the user IHS and the content provider IHS, the caching IHS including a cache and a caching engine that is configured to:
   receive a content request from the user IHS;
   generate a user-side key using content identifying information in the content request, wherein the content identifying information is unique to the content being requested;
   forward the content request to the content provider IHS over at least one network as a content partial information request and, in response, receive a content partial information response from the content provider IHS over the at least one network;
   generate a content-provider-side key using information in the content partial information response;
   perform a hashing operation on the content request using a combination of the user-side key and the content-provider-side key to produce a hashed content request; and
   use the hashed content request to retrieve content from the cache.

2. The encrypted cached content system of claim 1, wherein caching engine is configured to:
   decrypt the content that was retrieved from the cache using a combination of the user-side key and the content-provider-side key.

3. The encrypted cached content system of claim 2, wherein caching engine is configured to:
   validate the content by comparing a header of the content that was decrypted with header information in the content partial information response; and
   provide the content to the user IHS.

4. The encrypted cached content system of claim 1, wherein the using the hashed content request to retrieve the content from the cache includes:
   using the hashed content request to determine an entry in a content index that is associated with the content in the cache; and
   retrieving the content from the cache based on the association of the content and the entry in the content index.

5. The encrypted cached content system of claim 1, wherein caching engine is configured to:
   receive, prior to receiving the content request from the user IHS, a previous content request;
   generate, prior to receiving the content request from the user IHS, the user-side key using content identifying information in the previous content request;
   receive, prior to receiving the content request from the user IHS, the content and response headers from the content provider IHS over the at least one network;

generate, prior to receiving the content request from the user IHS, the content-provider-side key using content information from at least one of the content and the response headers;

encrypt, prior to receiving the content request from the user IHS, the content using a combination of the user-side key that was generated using the content identifying information in the previous content request and the content-provider-side key that was generated using the content information from at least one of the content and the response headers;

perform, prior to receiving the content request from the user IHS, the hashing operation on the previous content request using a combination of the user-side key that was generated using the content identifying information in the previous content request and the content-provider-side key that was generated using the content information from at least one of the content and the response headers to create an entry in a content index; and associate, prior to receiving the content request from the user IHS, the content that was encrypted with the entry in the content index and storing the content in the cache.

6. The encrypted cached content system of claim 1, wherein the content identifying information in the content request includes a Uniform Resource Identifier (URI).

7. The encrypted cached content system of claim 1, wherein the information in the content partial information response includes header information in a response that includes at least one of a last modified time, an ETAG value, content-length information, and a mime-type.

8. A caching information handling system (IHS), comprising:
a storage system including a cache;
a processor coupled to the storage system; and
a non-transitory memory coupled to the processor and including instructions that, when executed by the processor, cause the processor to provide a caching engine that is configured to:
receive a content request from a user IHS;
generate a user-side key using content identifying information in the content request, wherein the content identifying information is unique to the content being requested;
forward the content request to a content provider IHS over the at least one network as a content partial information request and, in response, receive a content partial information response from the content provider IHS over the at least one network;
generate a content-provider-side key using information in the content partial information response;
perform a hashing operation on the content request using a combination of the user-side key and the content-provider-side key to produce a hashed content request; and
use the hashed content request to retrieve content from the cache.

9. The caching IHS of claim 8, wherein caching engine is configured to:
decrypt the content that was retrieved from the cache using a combination of the user-side key and the content-provider-side key.

10. The caching IHS of claim 9, wherein caching engine is configured to:

validate the content by comparing a header of the content that was decrypted with header information in the content partial information response; and
provide the content to the user IHS.

11. The caching IHS of claim 8, wherein the using the hashed content request to retrieve the content from the cache includes:
using the hashed content request to determine an entry in a content index that is associated with the content in the cache; and
retrieving the content from the cache based on the association of the content and the entry in the content index.

12. The caching IHS of claim 8, wherein caching engine is configured to:
receive, prior to receiving the content request from the user IHS, a previous content request;
generate, prior to receiving the content request from the user IHS, the user-side key using content identifying information in the previous content request;
receive, prior to receiving the content request from the user IHS, the content and response headers from the content provider IHS over the at least one network;
generate, prior to receiving the content request from the user IHS, the content-provider-side key using information from at least one of the content and the response headers;
encrypt, prior to receiving the content request from the user IHS, the content using a combination of the user-side key that was generated using the content identifying information in the previous content request and the content-provider-side key that was generated using the information from at least one of the content and the response headers;
perform, prior to receiving the content request from the user IHS, the hashing operation on the previous content request using a combination of the user-side key that was generated using the content identifying information in the previous content request and the content-provider-side key that was generated using the information from at least one of the content and the response headers to create an entry in a content index; and
associate, prior to receiving the content request from the user IHS, the content that was encrypted with the entry in the content index and storing the content in the cache.

13. The caching IHS of claim 8, wherein the content identifying information in the content request includes a Uniform Resource Identifier (URI).

14. The caching IHS of claim 8, wherein the header in the content partial information response includes header information in a response that includes at least one of a last modified time, an ETAG value, content-length information, and a mime-type.

15. A method of caching content and retrieving cached content, comprising:
receiving, by a caching engine provided by a caching Information Handling System (IHS), a content request from a user IHS;
generating, by the caching engine, a user-side key using content identifying information in the content request, wherein the content identifying information is unique to the content being requested;
forwarding, by the caching engine, the content request to a content provider IHS over at least one network as a content partial information request and, in response, receiving a content partial information response from the content provider IHS over the at least one network;

generating, by the caching engine, a content-provider-side key using header information in the content partial information response;

performing, by the caching engine, a hashing operation on the content request using a combination of the user-side key and the content-provider-side key to produce a hashed content request; and using, by the caching engine, the hashed content request to retrieve content from the cache.

16. The method of claim 15, further comprising:

decrypting, by the caching engine, the content that was retrieved from the cache using a combination of the user-side key and the content-provider-side key.

17. The method of claim 16, further comprising:

validating, by the caching engine, the content by comparing a header of the content that was decrypted with header information in the content partial information response; and providing, by the caching engine, the content to the user IHS.

18. The method of claim 15, wherein the using the hashed content request to retrieve the content from the cache includes:

using, by the caching engine, the hashed content request to determine an entry in a content index that is associated with the content in the cache; and retrieving, by the caching engine, the content from the cache based on the association of the content and the entry in the content index.

19. The method of claim 15, further comprising:

receiving, by the caching engine prior to receiving the content request from the user device, a previous content request;

generating, by the caching engine prior to receiving the content request from the user IHS, the user-side key using content identifying information in the previous content request;

receiving, by the caching engine prior to receiving the content request from the user IHS, the content and response headers from the content provider IHS over the at least one network;

generating, by the caching engine prior to receiving the content request from the user IHS, the content-provider-side key using content information from at least one of the content and the response headers;

encrypting, by the caching engine prior to receiving the content request from the user IHS, the content using a combination of the user-side key that was generated using the content identifying information in the previous content request and the content-provider-side key that was generated using the content information from at least one of the content and the response headers;

performing, by the caching engine prior to receiving the content request from the user IHS, the hashing operation on the previous content request using a combination of the user-side key that was generated using the content identifying information in the previous content request and the content-provider-side key that was generated using the content information from at least one of the content and the response headers to create an entry in a content index; and associating, by the caching engine prior to receiving the content request from the user IHS, the content that was encrypted with the entry in the content index and storing the content in the cache.

20. The method of claim 15, wherein the content identifying information in the content request includes a Uniform Resource Identifier (URI), and wherein the information in the content partial information response includes header information in a response that includes at least one of a last modified time, an ETAG value, content-length information, and a mime-type.

* * * * *